Sept. 8, 1925.

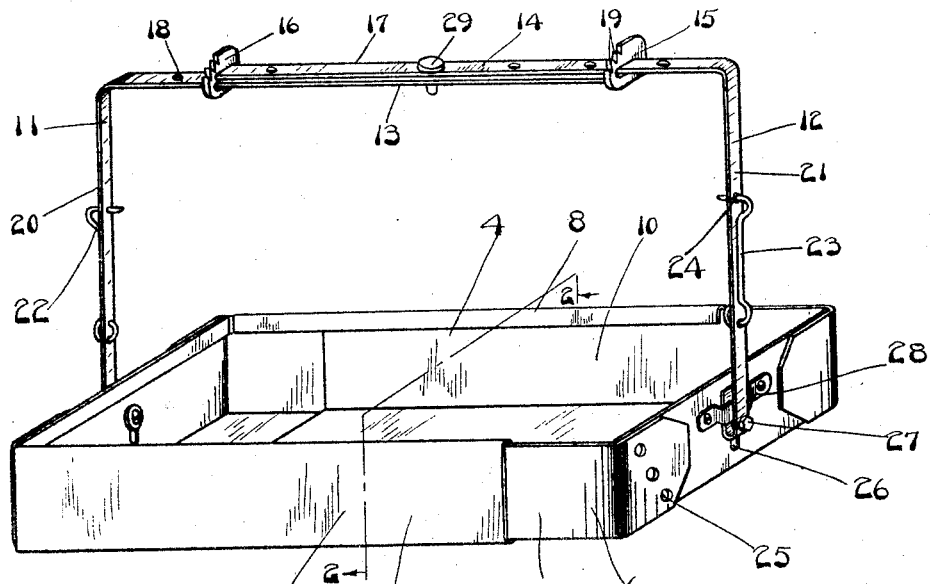

M. JUDGE 1,552,856

ADJUSTABLE CONTAINER

Filed June 18, 1923

Inventor
Michael Judge.

By Walter F. Murray
Attorney

Patented Sept. 8, 1925.

1,552,856

UNITED STATES PATENT OFFICE.

MICHAEL JUDGE, OF CINCINNATI, OHIO.

ADJUSTABLE CONTAINER.

Application filed June 18, 1923. Serial No. 646,095.

*To all whom it may concern:*

Be it known that I, MICHAEL JUDGE, a citizen of the United States of America, and a resident of Cincinnati, in the county of Hamilton and State of Ohio, have invented a new and useful Improvement in an Adjustable Container, of which the following is a specification.

An object of my invention is to provide a container or carrier that may be adjusted to accommodate same to various conditions.

Another object of my invention is to provide a device that will permit such positioning of the parts thereof that the device may be applied to diversified uses.

Another object of my invention is to provide a device for the purposes stated that will be automatic in attaining a non-capsizing condition.

These and other objects are attained by the means described herein and disclosed in the accompanying drawings, in which:

Fig. 1 is a perspective view of a carrier embodying my invention.

Fig. 2 is a sectional view on line 2—2 of Fig. 1.

Fig. 3 is a side elevation of a device embodying my invention and shown in one of the uses to which same may be put.

Figure 4:
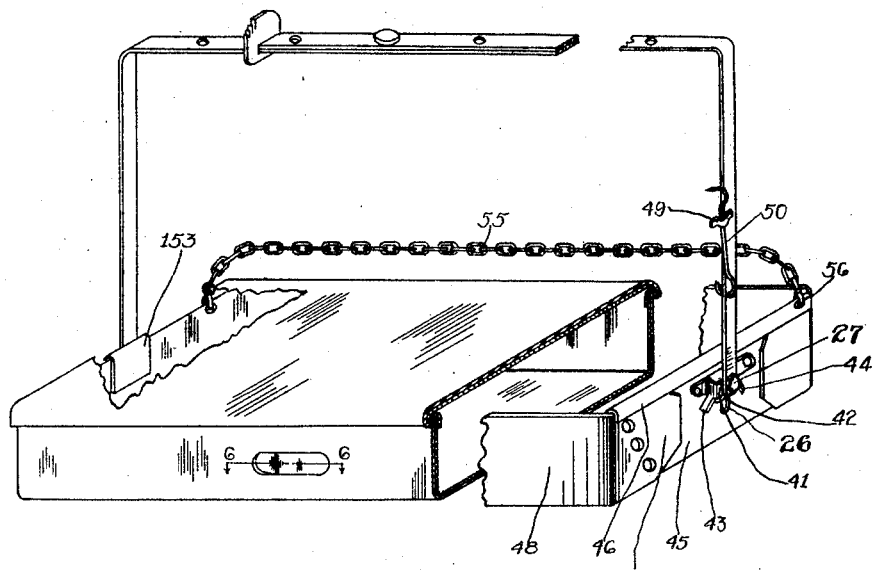
Fig. 4 is a fragmental perspective view of a device embodying various modifications of my invention.

The carrier 4 comprises a pair of telescoping casings 5 and 6. Each casing comprises a bottom, sides and an end. The sides 7 and 8 of the casing 5 are inturned at their upper ends whereby to develop the casing 5 into such form that the sides 9 and 10 of the casing 6 may be slid in parallelism with the sides of the casing 5 without separation therefrom. The ends of the casings each carry a handle section. These handle sections 11 and 12 are substantially identical in structure, the upper or horizontal ends 13 and 14 thereof overlapping and telescoping. The ends of the sections 13 and 14 of the handle each carry a lug 15 and 16. Each lug has formed in it a slot through which the other handle element may slide, and the handle elements have formed in them bores 17 and 18 that may be brought into registration. The lugs have teeth 19 formed on them for a purpose that will be explained hereafter. The sides 20 and 21 of the handle structures carry hooks 22 and 23. One end of each of the hooks is pivotally mounted on one of the handles, and the other ends of the hooks may be inserted through suitable slots 24 in the handles when the hooks are not otherwise used. The free ends of the hooks are capable of entry into perforations 25 formed in the ends of the casings for positioning the carrier as shown in Fig. 3. The ends of the casings are provided with elongated vertical slots 26 through which bolts 27 slidably extend. The bolts are carried by the lower ends of the handle sides. The lower ends of the handles are U-shaped, the ends being disposed in immediate proximity to the outer faces of the ends of the casings. The ends of the casings carry U-shaped straps 28 and the lower ends of the handles are adapted to enter the pockets or ways formed between the straps 28 and the casing ends thereby precluding tilting of the carrier upon the bolts 27. When the handle is moved to its lowermost limit the upturned ends of the sides of the handles clear the straps 28 and permit pivotal movement of the handles upon the bolts 27.

A suitable pin 29 may be passed through the perforations in the handles to lock the handles against extension or contraction.

Explanation as to the operation of the device is unnecessary because of the simplicity of the structure; however, it is desired to call attention to the fact that carriers such as disclosed herein may be suspended from a ladder and may carry several buckets of paint or the like. A suitable retaining hook may be passed through the centermost holes in the handles, thereby dispensing with the pin 29 and also supporting the carrier in a balanced position. In the event that it is desired to use the carrier on a roof, for supporting buckets of paint or the like, it will be evident by reference to Fig. 3 that there is no likelihood of upsetting a bucket of paint and that the teeth on the lugs 15 and 16 will preclude slipping of the carrier and contents thereof. The various holes 25 permit adjustment of the carrier to accommodate same to various angles of inclination of various roofs.

Figure 5:
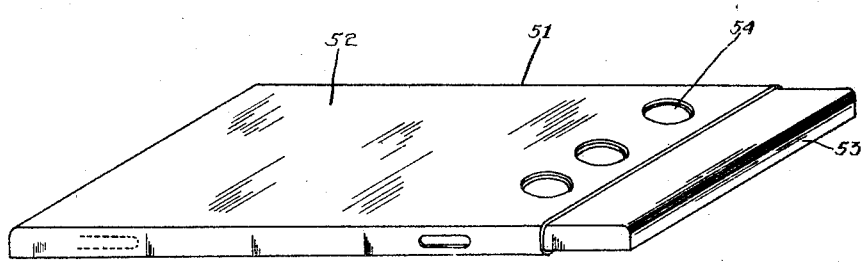
Fig. 5 is a perspective view of an extensible cover or lid forming a detail of my invention.
Figure 6:
Fig. 6 is an enlarged sectional view on line 6—6 of Fig. 4.

In the modification shown in Fig. 4 the strap or bail 41 is provided with overlapping flanges 42 that seal the upper ends of the ways into which the lower free ends of the handles may enter. The straps are also provided with downwardly diverging extensions 43 and 44 that serve as guides for directing the free lower ends of the handles into the ways. The ends 45 of the casings may be provided with outwardly turned flanges 46 that extend downward over the upper edges of the inwardly extending ends 47 of the sides 48 of the casings. In lieu of the holes 24 for the reception of the ends of the hooks 22 and 23, there may be provided spring clips 49 for yieldingly retaining the hooks 50 in position upon the handle. The sides of the casings may be provided with suitable means for precluding accidental separation. As shown in Figs. 4, 5, and 6 this means comprises a slot in one casing for the reception of a lug formed from the other casing for entry into the slot in the first casing. The lid 51 comprises telescoping sections 52 and 53 that may be provided with a like means for precluding accidental separation one from the other. A depending flange 153 may be carried by the ends of the casings for covering the slots 26 in the ends, at the inside of the carrier. The lid may be provided with suitable apertures 54 if same be desired. In reference to Fig. 4 it will be apparent that the telescopic lid may be extended and contracted simultaneously with similar adjustments of the casings 5 and 6.

A chain 55 having detachable snap fasteners 56 at its ends may be employed for attaching the carrier to ladders and the like when working on roofs of such material that the lugs 15 and 16 would not secure a firm grip, for example on a slate roof. The snap fasteners may be detachably mounted on the carrier by insertion thereof through suitable apertures in the ends of the casings. A plurality of such chains may be employed as auxiliary carrying means.

What I claim is:

1. In a device of the class described the combination of a carrier, a handle for the carrier, the carrier being normally suspended from the handle and disposed horizontally and at right angles to the handle, and means associated with the handle and the carrier for supporting the carrier at an angle to the handle with the handle positioned below the carrier whereby the handle may co-operate with the carrier in supporting the carrier upon an inclined surface in substantially a horizontal plane.

2. In a device of the class described the combination with a carrier of a handle pivotally mounted upon the carrier, the carrier being normally suspended from the handle and disposed horizontally and at right angles to the handle, and means for fixedly positioning the handle below and at an angle to the carrier whereby the handle may retain the carrier in a horizontal plane while supported on an inclined surface.

3. In a device of the class described the combination of a carrier comprising telescoping casings each in turn comprising sides, ends and bottoms, the one casing being provided with overlapping upper edges on the sides for the reception of the sides of the other casing, the ends of the casing being provided with pockets, and a handle section pivotally mounted on each end and telescoping upon the other handle section each handle section having a free end adapted to enter and be withdrawn from the pocket for locking and unlocking the carrier and handle to one another whereby to permit and preclude relative pivotal movement of the handle and carrier.

4. In a device of the class described the combination of a carrier comprising telescoping casings each in turn comprising sides, ends and bottoms, the one casing being provided with overlapping upper edges on the sides for the reception of the sides of the other casing, a handle section pivotally and slidably mounted on each end and telescoping upon the other handle section, and co-operating means on the ends and the handle sections for locking the casings against pivotal movement upon the handle sections, said co-operating means comprising an upwardly turned end on each handle section and a pocket open at its bottom carried by the ends of the casings, the upwardly turned ends of the handle sections adapted to move into and from said pockets by a sliding movement of the handle on its mountings.

5. In a device of the class described the combination of a carrier comprising telescoping casings each in turn comprising sides, ends and bottoms, the one casing being provided with overlapping upper edges on the sides for the reception of the sides of the other casing, a handle section pivotally mounted on each end and telescoping upon the other handle section, the ends being provided with apertures, and hooks pivotally carried by the handle sections for engagement in the apertures for fixedly positioning the handle sections in relation to the carrier casings.

6. In a device of the class described the combination of a carrier comprising telescoping casings each in turn comprising sides, ends and bottoms, the one casing being provided with overlapping upper edges on the sides for the reception of the sides of the other casing, a handle section pivotally mounted on each end and telescoping upon the other handle section, the ends being provided with apertures, hooks pivotally carried by the handle sections for engagement in the apertures for fixedly positioning the handle sections in relation to the carrier casings, and means carried by the handle sections for frictional engagement upon a surface for precluding slipping of the carrier.

7. As a new article of manufacture a bail of a substantially U-shape having a cover for closing one side thereof and provided with diverging extensions at its other side for directing a holding means between the branches of the bail.

8. In a device of the class described the combination of a carrier, a handle pivotally mounted upon the carrier, positioning means for detachably fixing the handle below and at an angle to the carrier whereby to support the carrier in a horizontal plane on an inclined surface, and means for detachably fixing the positioning means upon the handle.

9. In a device of the class described the combination of a carrier, a handle pivotally mounted upon the carrier, for normally suspending the carrier from the handle, means for fixedly positioning the handle below and at an angle to the carrier, whereby to support the carrier in a horizontal plane on an inclined surface, and means carried by the device for attachment to a relatively fixed object for precluding displacement of the device on the inclined surface.

In testimony whereof I have hereunto subscribed my name this 7th day of June, 1923.

MICHAEL JUDGE.